US012566901B2

(12) United States Patent
Gabel et al.

(10) Patent No.: US 12,566,901 B2
(45) Date of Patent: Mar. 3, 2026

(54) MODEL-BASED SYSTEMS ENGINEERING TOOL UTILIZING IMPACT ANALYSIS

(71) Applicant: The Boeing Company, Chicago, IL (US)

(72) Inventors: Andrew J. Gabel, Oklahoma City, OK (US); Patrick D. Dees, Huntsville, AL (US); Sophan Im, El Segundo, CA (US); Roger K. Bolton, Hunstville, AL (US); Gregory S. Allen, Louisville, KY (US)

(73) Assignee: The Boeing Company, Arlington, VA (US)

( * ) Notice: Subject to any disclaimer, the term of this patent is extended or adjusted under 35 U.S.C. 154(b) by 1079 days.

(21) Appl. No.: 17/581,240

(22) Filed: Jan. 21, 2022

(65) Prior Publication Data

US 2022/0237341 A1     Jul. 28, 2022

Related U.S. Application Data

(60) Provisional application No. 63/142,819, filed on Jan. 28, 2021.

(51) Int. Cl.
| | |
|---|---|
| *G06F 30/12* | (2020.01) |
| *G06F 30/20* | (2020.01) |
| *G06F 111/02* | (2020.01) |
| *G06F 111/20* | (2020.01) |

(52) U.S. Cl.
CPC .............. *G06F 30/20* (2020.01); *G06F 30/12* (2020.01); *G06F 2111/02* (2020.01); *G06F 2111/20* (2020.01)

(58) Field of Classification Search
CPC ...... G06F 30/20; G06F 30/12; G06F 2111/02; G06F 2111/20
See application file for complete search history.

(56) References Cited

U.S. PATENT DOCUMENTS

| | | | |
|---|---|---|---|
| 7,698,224 B2 | 4/2010 | Chatlain et al. | |
| 11,023,934 B1 * | 6/2021 | Jacobs, II | .......... G06Q 30/0283 |
| 11,138,063 B1 * | 10/2021 | Diao | ................... G06F 11/0721 |
| 2011/0087513 A1 | 4/2011 | Floyd et al. | |
| 2012/0109589 A1 * | 5/2012 | Thompson | .............. G06F 30/17 703/1 |

(Continued)

*Primary Examiner* — Brian W Wathen
(74) *Attorney, Agent, or Firm* — Alleman Hall LLP

(57) ABSTRACT

A model-based systems engineering tool that determines an impact analysis of a change upon a system model includes a relations database storing a framework describing pre-established relationships between a plurality of elements that are part of the system model. The pre-established relationships are determined based on a model-based systems engineering architecture. The model-based systems engineering tool includes one or more processors in electronic communication with the relations database and a memory coupled to the processors. The memory stores data into one or more databases and program code that causes the model-based systems engineering tool to receive an indication to change a root element, wherein the root element is one of the plurality of elements that are part of the system model. In response to receiving the indication to change the root element, the model-based systems engineering tool determines a first level of elements of the system model.

20 Claims, 13 Drawing Sheets

(56)         References Cited

U.S. PATENT DOCUMENTS

| | | | |
|---|---|---|---|
| 2017/0206304 A1* | 7/2017 | Goodman | ............ G06F 16/951 |
| 2019/0392391 A1 | 12/2019 | Slack et al. | |
| 2021/0342761 A1* | 11/2021 | Wilson, Jr. | ............. G06F 30/13 |

* cited by examiner

| # | Name | Owner | Applied Stereotype | Allocation | Satisfy | Trace | Described Use Case |
|---|------|-------|--------------------|------------|---------|-------|--------------------|
| 1 | 0 | Start Shutdown Procedures (... | | | | | |
| 2 | Shutdown Req 1 | Tier 0 | Requirement [Class] | | Shutdown | Shutdown / 22 SDR 1.1 | |
| 3 | SDR 1.1 | Tier 1 | MyRequirement Stereotype [class] | | Start Shutdown Procedures | :Eject Black Box / Component 3.1.1 / Start Shutdown Procedures / 29 SDR 1.1.1 / 21 Shutdown Req 1 / 39 SDR 1.1.2 | |
| 4 | SDR 1.1.1 | Tier 2 | DeeperRequirement Stereotype | | Wipe Data | Wipe Data / 22 SDR 1.1 | |
| 5 | SDR 1.1.2 | Tier 2 | DeeperRequirement Stereotype | | Eject Black Box | Eject Black Box / 22 SDR 1.1 / Requirement Update: | |
| 6 | Eject Black Box | Functional | | Component 3.1.1 | 39 SDR 1.1.2 | 39 SDR 1.1.2 / :Eject Black Box / Component 3.1.1 / Start Shutdown Procedures | |
| 7 | Start Shutdown Procedures | Functional | | Component 3.1 | 22 SDR 1.1 | 22 SDR 1.1 / Eject Black Box | |

MODEL-BASED SYSTEMS ENGINEERING TOOL UTILIZING IMPACT ANALYSIS

CROSS-REFERENCE TO RELATED APPLICATION

This application claims priority to U.S. Provisional Application No. 63/142,819, filed Jan. 28, 2021. The contents of the application are incorporated herein by reference in its entirety.

INTRODUCTION

The present disclosure relates to a model-based systems engineering tool that utilizes impact analysis. In particular, the present disclosure is directed towards a model-based systems engineering tool that determines elements that are impacted by a change to a system model.

BACKGROUND

Engineering changes are inevitable in a product development life cycle. For example, new or revised requirements, the emergence of new technology, market feedback, or variations of components and raw materials may necessitate an engineering change. However, each engineering change affects many factors such as, for example, cost, schedules of related processes, and various system and sub-system components. In systems engineering, the task of identifying the impact of an engineering change to a system has typically been a manual and arduous process. Systems are traditionally defined by documents. However, it is often difficult to manage and trace changes using documentation. For example, various experts in a particular field may spend hours, if not days, determining which parts of a system are affected by an engineering change, as well as if the engineering change warrants additional changes to any affected components of the system.

Model-based systems engineering attempts to shift away from documents, and instead provides a centralized system model. Specifically, model-based systems engineering refers to a methodology for developing and analyzing a system based on graphical representations of the underlying functions, interfaces, relationships, requirements, parameters, behaviors, and architecture that define the system. Model-based systems engineering allows for engineers to analyze a system, even before the system is built.

SUMMARY

According to several aspects, a model-based systems engineering tool that determines an impact analysis of a change upon a system model is disclosed and includes a relations database that stores a framework describing pre-established relationships between a plurality of elements that are part of the system model. The pre-established relationships are determined based on a model-based systems engineering architecture. The model-based systems engineering tool also includes one or more processors in electronic communication with the relations database and a memory coupled to the one or more processors. The memory stores data into one or more databases and program code that, when executed by the one or more processors, causes the model-based systems engineering tool to receive an indication to change a root element. The root element is one of the plurality of elements that are part of the system model. In response to receiving the indication to change the root element, the system determines a first level of elements of the system model having a direct relationship to the root element. The first level of elements is determined based on the pre-established relationships between the plurality of elements stored in the relations database. The model-based systems engineering tool generates a first graphic that illustrates the pre-established relationships between the root element and the first level of elements.

In another aspect, a method for determining an impact analysis of a change upon a system model by a model-based systems engineering tool is disclosed. The method includes receiving, by a computer, an indication to change a root element. The root element is one of a plurality of elements that are part of the system model. In response to receiving the indication to change the root element, the method includes determining a first level of elements of the system model having a direct relationship to the root element. The first level of elements is determined based on pre-established relationships between the plurality of elements stored in a relations database. The pre-established relationships are determined based on a model-based systems engineering architecture. Finally, the method includes generating a first graphic that illustrates the pre-established relationships between the root element and the first level of elements.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

FIG. 8 is an illustration of a detail table, according to an exemplary embodiment;

DETAILED DESCRIPTION

The present disclosure is directed towards a model-based systems engineering tool that determines elements that are impacted by a change to a system model. Specifically, a user changes one or more root elements of the system model, where the root element is one of the elements that are part of the system model. In response to receiving the indication to change the root element, the model-based systems engineering tool determines a first level of elements having a direct relationship to the root element. The model-based system engineering tool also determines a second level of elements of the system. The second level of elements each have a direct relationship to one of the first level of elements. The first level of elements and the second level of elements are determined based on pre-established relationships between the elements stored in a relations database. Once the first level of elements and the second level of elements are established, the model-based systems engineering tool then groups and visualizes the elements affected by the change in several different arrangements to assist the user in understanding the potential implications of the change.

The following description is merely exemplary in nature and is not intended to limit the present disclosure, application, or uses.

Figure 1:
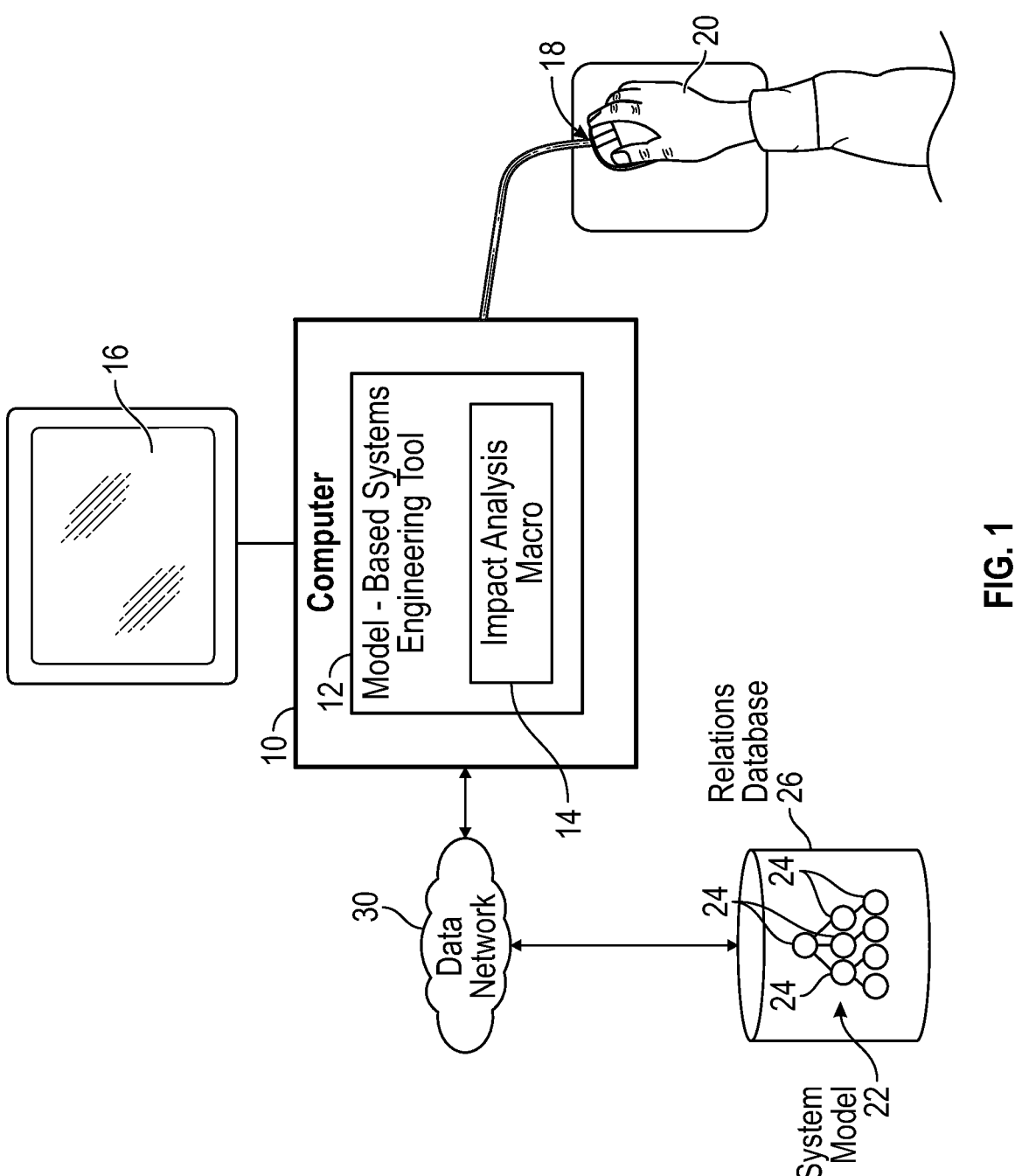
FIG. 1 is a schematic diagram of a computer executing the disclosed model-based systems engineering tool including an impact analysis macro, according to an exemplary embodiment.

Referring to FIG. 1, a computer 10 that executes a model-based systems engineering tool 12 is illustrated. The model-based systems engineering tool 12 includes an impact analysis macro 14. The computer 10 includes a display device 16 and one or more input devices 18. The display device 16 is configured to display visual images containing text and graphics, and the input device 18 is configured to receive input from a user 20. In the non-limiting embodiment as shown in FIG. 1, the input device 18 is a hand-held pointing device such as a computer mouse, however, it is to be appreciated that the computer 10 may include other input devices 18 as well such as, for example, a keyboard. The impact analysis macro 14 enables the model-based systems engineering tool 12 to determine an impact analysis of a change upon a system model 22 that includes a plurality of elements 24. In one non-limiting embodiment, the system model 22 represents a physical system such as, for example, an aircraft assembly or sub-assembly, where the elements 24 each represent discrete parts of the system model 22. However, it is to be appreciated that the system model 22 is not limited to a structure having physical parts. Indeed, in another embodiment the system model 22 represents software, processes, and procedures. As explained below, the model-based systems engineering tool 12 explores the impact of a change to one or more elements 24 based on the modified element's relationship with the other elements 24 that are part of the system model 22.

The model-based systems engineering tool 12 includes a relations database 26 that stores a framework describing pre-established relationships between the plurality of elements 24 that are part of the system model 22. The pre-established relationships are determined based on a model-based systems engineering architecture. Specifically, the pre-established relationships are defined based on a requirements, functional, logical, and physical (or solution) (RFLP) architecture. Referring to both FIGS. 1 and 2, the pre-established relationships between the elements 24 that are part of the system model 22 are illustrated are linkages 28. In the non-limiting embodiment as shown in FIG. 1, the computer 10 is remotely located and is in wireless communication with the relations database 26 over a data network 30. However, it is to be appreciated that the relations database 26 may be stored locally as well in another embodiment.

Figure 2:
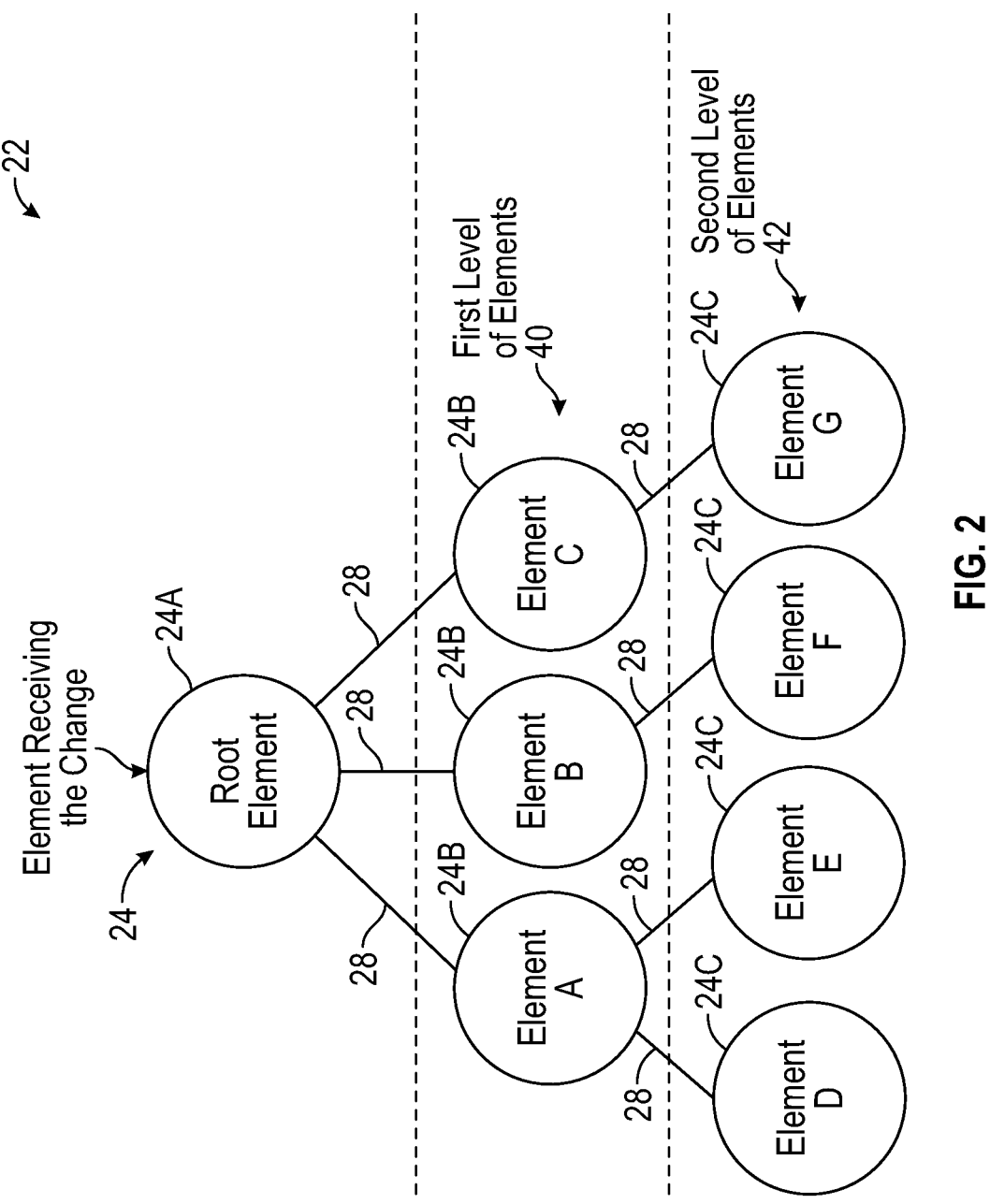
FIG. 2 is a diagram illustrating a root element that a user selects as receiving a change, a first level of elements, and a second level of elements, according to an exemplary embodiment.

Continuing to refer to FIGS. 1 and 2, when executed, the impact analysis macro 14 generates a visual indicator upon the display device 16 prompting the user 20 to select one or more elements 24 that are part of the system model 22 that are receiving a change, which is referred to as a root of the change. As seen in FIG. 2, the element 24 that is receiving the change is referred to as a root element 24A. The model-based systems engineering tool 12 receives an indication to change the root element 24A from the user 20, and in particular from the input device 18. The root element 24A is one of the plurality of elements 24 that are part of the system model 22. Although FIG. 2 illustrates only a single root element 24A, it is to be appreciated in an alternative embodiment, the indication is to change more than one root element 24A as well. Specifically, in one embodiment, the model-based system engineering tool 12 is configured to analyze the impact analysis of up to three root elements 24A.

As explained in greater detail below, the model-based systems engineering tool 12 then determines a first level of elements 40 that are directly related to the root element 24A. That is, the linkages 28 directly link the root element 24A to one of the elements 24 of the first level of elements 40. For example, in the embodiment as shown in FIG. 2, there are three elements 24B that are part of the first level of elements 40, namely Element A, Element B, and Element C. The model-based systems engineering tool 12 also determines a second level of elements 42 that are directly related to one of the elements 24B that are part of the first level of elements 40. That is, the linkages 28 directly link one of the elements 24B that are part of the first level of elements 40 to one of the elements 24C that are part of the second level of elements 42. In the example as shown in FIG. 2, there are four elements 24C that are part of the second level of elements 42, namely Element D, Element E, Element F, and Element G.

Figure 3:
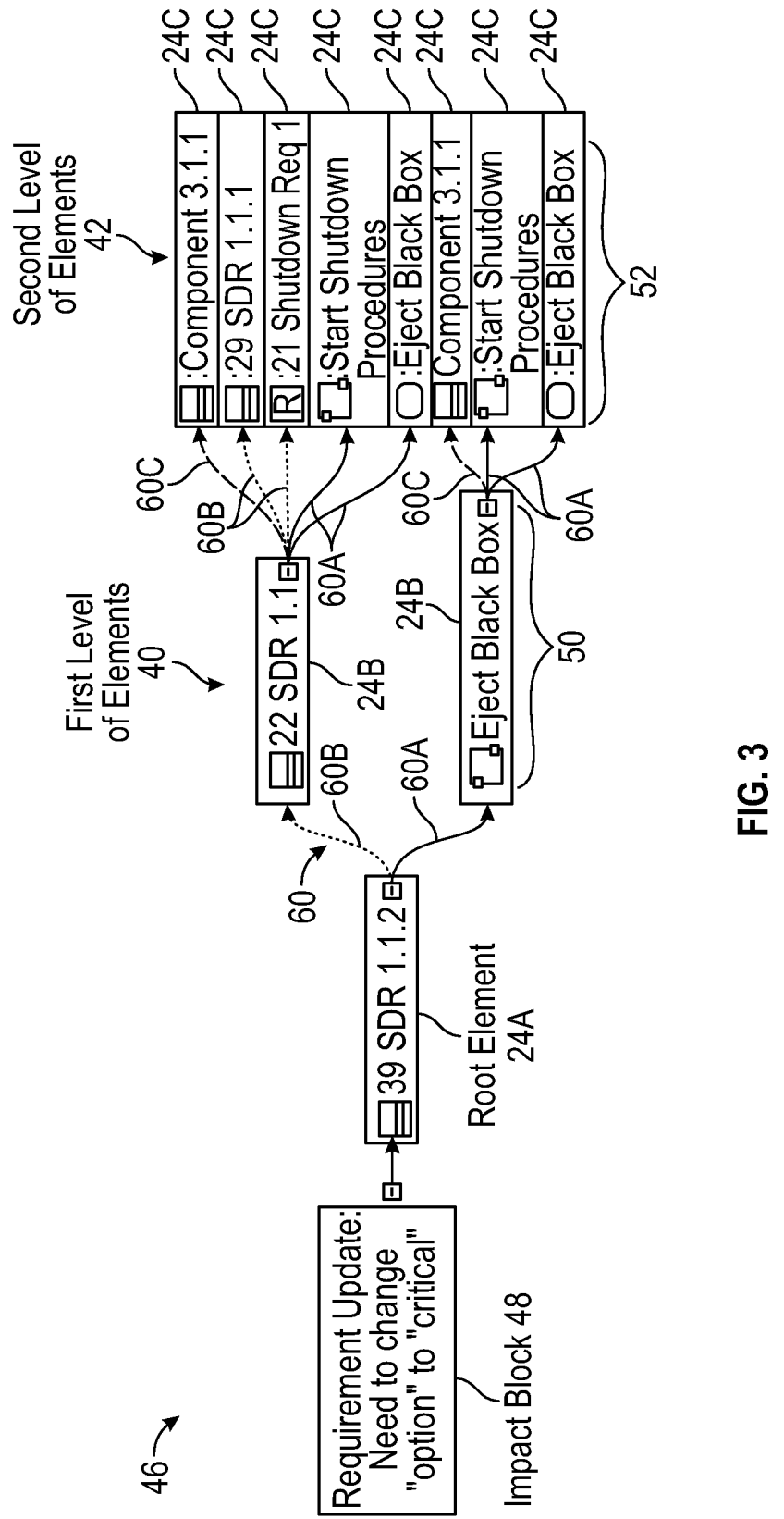
FIG. 3 is an illustration of a relation map including an impact block, the root element, the first level of elements, and the second level of elements, according to an exemplary embodiment.

FIG. 3 illustrates a relation map 46 including an impact block 48, the root element 24A, the first level of elements 40, and the second level of elements 42. The impact block 48 is configured to store one or more attributes describing the change that the model-based systems engineering tool 12 is evaluating. For example, the user 20 (FIG. 1) fills in the impact block 48 with text describing the change to the root element 24A. In the non-limiting embodiment as shown in FIG. 3, the impact block 48 states that the change is a requirement update. Specifically, the requirement is changed from optional to critical. Therefore, the root element 24A represents a requirement (i.e., 39 SDR 1.1.2) that is being changed from an optional to a critical requirement.

Referring to both FIGS. 1 and 3, In response to receiving the indication to change the root element 24A, the model-based systems engineering tool 12 (FIG. 1) determines the first level of elements 40 that have a direct relationship to the root element 24A. The first level of elements 40 are determined based on the pre-established relationships between the plurality of elements 24 that are stored in the relations database 26. The model-based systems engineering tool 12 then generates a first graphic 50 that illustrates the pre-established relationships between the root element 24A and the first level of elements 40. For example, in the embodiment as shown in FIG. 3, the first level of elements 40 include two elements 24B that are labeled as "22 SDR 1.1" and "Eject Black Box".

After determining the first level of elements 40, the model-based systems engineering tool 12 (FIG. 1) then determines the second level of elements 42, where the second level of elements 42 each have a direct relationship to one of the elements 24B of the first level of elements 42. As seen in FIG. 3, the model-based systems engineering tool 12 generates a second graphic 52 that illustrates the pre-defined relationships between the first level of elements 40 and the second level of elements 42. In the example as shown in FIG. 3, there are eight elements 24C that are part of the second level of elements 42.

Although FIG. 3 illustrates two levels of elements 24, it is to be appreciated that the user 20 may re-execute the model-based systems engineering tool 12 (FIG. 1) again to discover a third level of elements (not shown) that each have a direct relationship to one of the elements 24C of the second level of elements 42. In fact, the user 20 may re-execute the model-based systems engineering tool 12 again to discover a fourth level of elements (not shown) as well. It is to be appreciated that the user may re-execute the model-based systems engineering tool 12 until a specific level of data is reached.

Referring to FIGS. 1 and 3, the model-based systems engineering tool 12 also determines relationship attributes 60 between the elements 24 that are part of the system model 22. The relationship attribute 60 is described by the pre-established relationships between the plurality of elements 24 of the system model 22 stored in the relations database 26. The model-based systems engineering tool 12 determines a relationship attribute 60 between the root element 24A and each element 24B of the first level of elements 40. Specifically, referring to FIGS. 1, 3, and 7, the relationship attribute 60 is one of the following: a functional relationship attribute 60A, a requirement relationship attribute 60B, a logical relationship attribute 60C, a solution relationship attribute 60D, a use case relationship attribute 60E, an interface relationship attribute 60F, and a state relationship attribute 60G (the relationship attributes 60 are listed in FIG. 7). It is to be appreciated that the relationship attributes 60 are all Systems Modeling Language (SysML) standard terminology.

The functional relationship attribute 60A is illustrated in FIG. 3 as a solid line, and represents an analysis establishing what the system model 22 is capable of accomplishing. In other words, the functional relationship attribute 60A indicates how well the system performs in quantitative measurable terms. The requirement relationship attribute 60B is shown in FIG. 3 as a dotted line and specifies a capability or a condition that is to be satisfied. The logical relationship attribute 60C is shown in broken line and represents a logical architecture that provides as much detail as possible without constraining that architecture to a particular technology. The solution relationship attribute 60D (not represented in FIG. 3) represents a specialized abstraction relationship between two elements 24. Specifically, one of the elements 24 represents a specification (i.e., a supplier) and the other element 24 represents an implementation of the latter (i.e., a client). The use case relationship attribute 60E is not represented in FIG. 3 and is the specification of a set of actions performed by the system, which yields an observable result. The observable result may be of value for one or more actors or stakeholders of the system. The interface relationship attribute 60F is also not represented in FIG. 3 and describes the interface between the elements 24. The state relationship attribute 60G is also not represented in FIG. 3 and represents a condition of a system or element.

Figure 4:
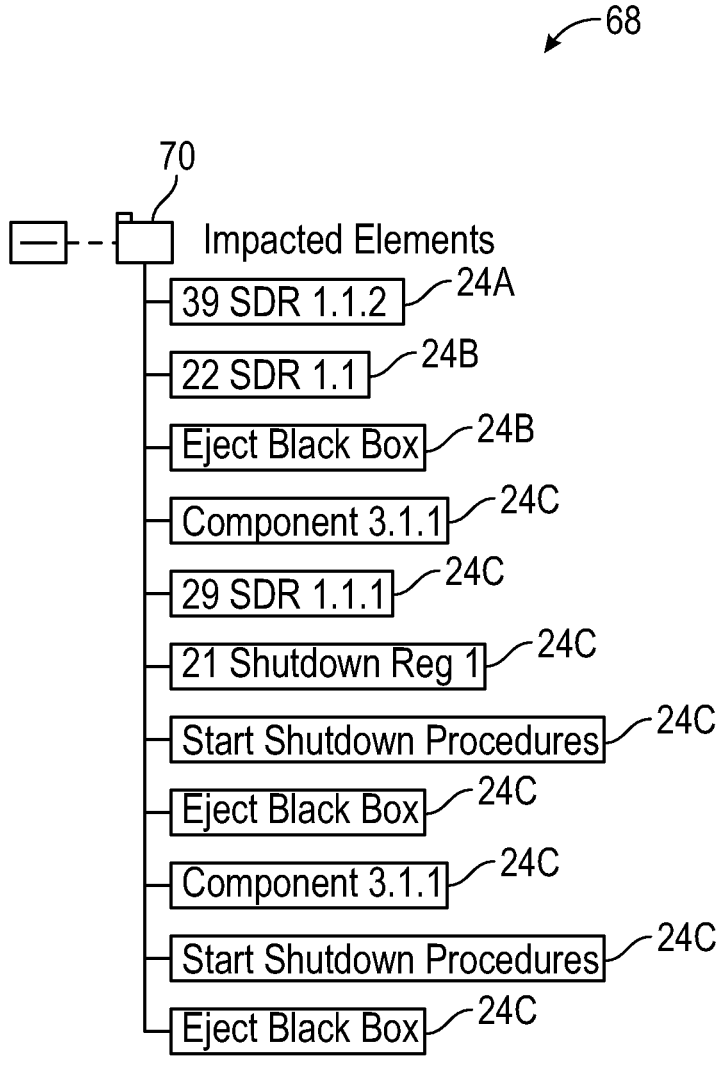
FIG. 4 is an illustration of an impact list, according to an exemplary embodiment.

Once the first level of elements 40, the second level of elements 42, and the relationship attributes 60 between the elements 24 that are part of the system model 22 are established, the model-based systems engineering tool 12 then groups and visualizes the elements 24 in a variety of different arrangements to assist the user 20 in understanding the potential implications of the change. Referring now to FIGS. 1 and 4, in one embodiment the model-based systems engineering tool 12 is configured to generate an impact list 68. The impact list 68 includes the root element 24A, each element 24B of the first level of elements 40 as well as each element 24C of the second level of elements 42. As seen in FIG. 4, in one embodiment the root element 24A, the elements 24B that are part of the first level of elements 40, and the elements 24C that are part of the second level of elements 42 are stored in a folder 70 named "Impacted Elements". The impact list 68 may be shown upon the display device 16 of the computer 10 to the user 20. Accordingly, the user 20 may be able to quickly see all of the elements 24 impacted by a specific change.

Figure 5:
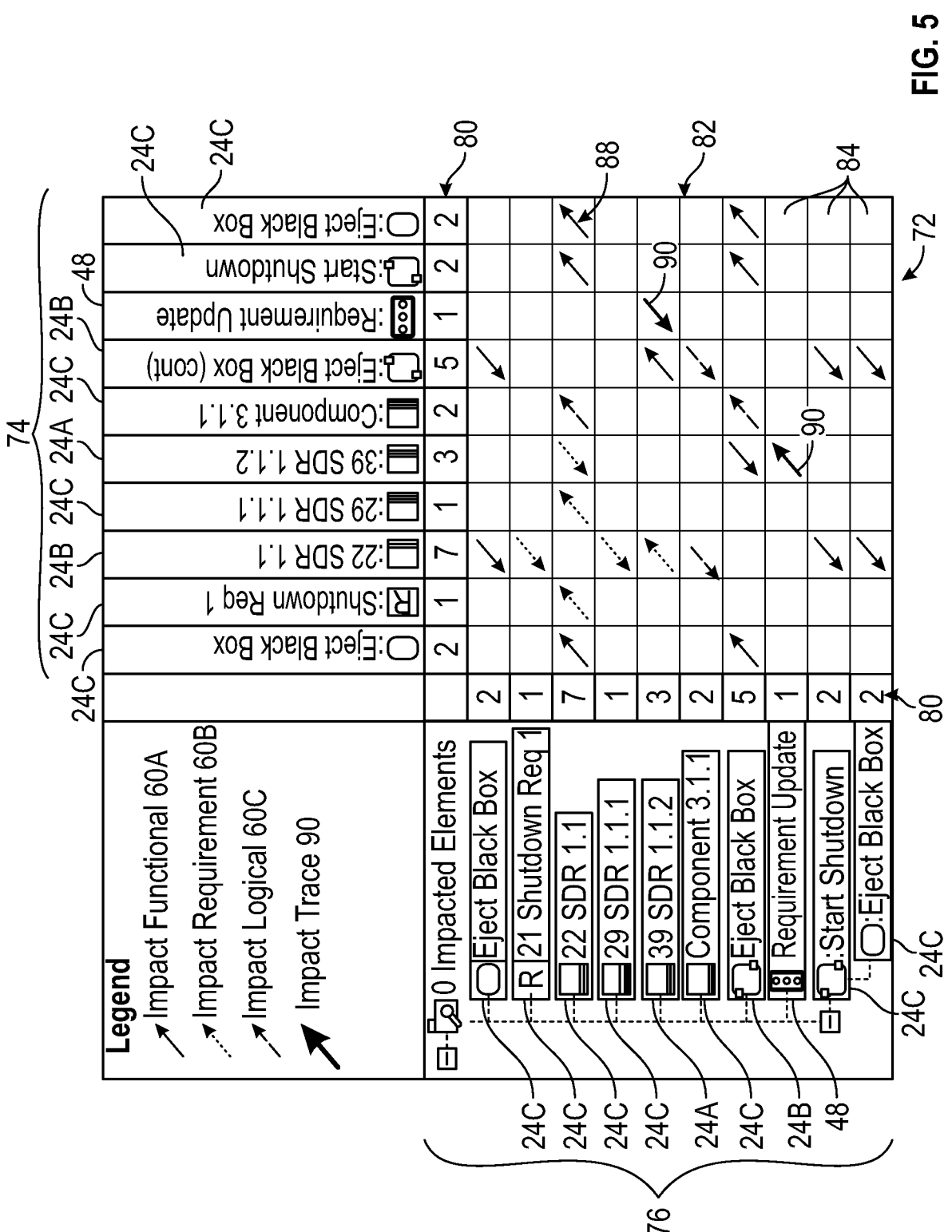
FIG. 5 is an illustration of a dependency matrix, according to an exemplary embodiment.

Referring to FIGS. 1 and 5, in another embodiment the model-based systems engineering tool 12 is configured to generate a dependency matrix 72. The dependency matrix 72 illustrates the relationship attributes 60 between the root element 24A and each element 24B that is part of the first level of elements 40, and between each element 24B that is part of the first level of elements 40 and each element 42 that is part of the second level of elements 42. Specifically, the dependency matrix 72 includes a plurality of columns 74 and a plurality of rows 76, where the root element 24A, the elements 24B that are part of the first level of elements 40, and the elements 24C that are part of the second level of elements 42 are each listed along the plurality of columns 74 and the plurality of rows 76. Furthermore, in the embodiment as shown in FIG. 5, the impact block 48 is also listed in the plurality of columns 74 and the plurality of rows 76. In one embodiment, a number 80 is included as part of the dependency matrix 72. The number 80 indicates a number of relationship attributes 60 corresponding to the root element 24A, the elements 24B, the elements 24C, and the impact block 48. For example, the root element 24A (which is "39 SDR 1.1.2") includes two relationship attributes 60. As such, the number 80 next to the root element 24A lists "2".

The dependency matrix 72 further includes a grid 82 defining a plurality of spaces 84. If a relationship attribute 60 exists between two elements 24, then the corresponding space 84 of the grid 82 is occupied by an arrow 88. Similar to the embodiment as shown in FIG. 3, the functional relationship attribute 60A is illustrated as a solid line, the requirement relationship attribute 60B is shown in dotted line, and the logical relationship attribute 60C is shown in broken line. Furthermore, an impact trace 90 between the impact block 48 and the root element 24A is shown in bold line.

Figure 6A:
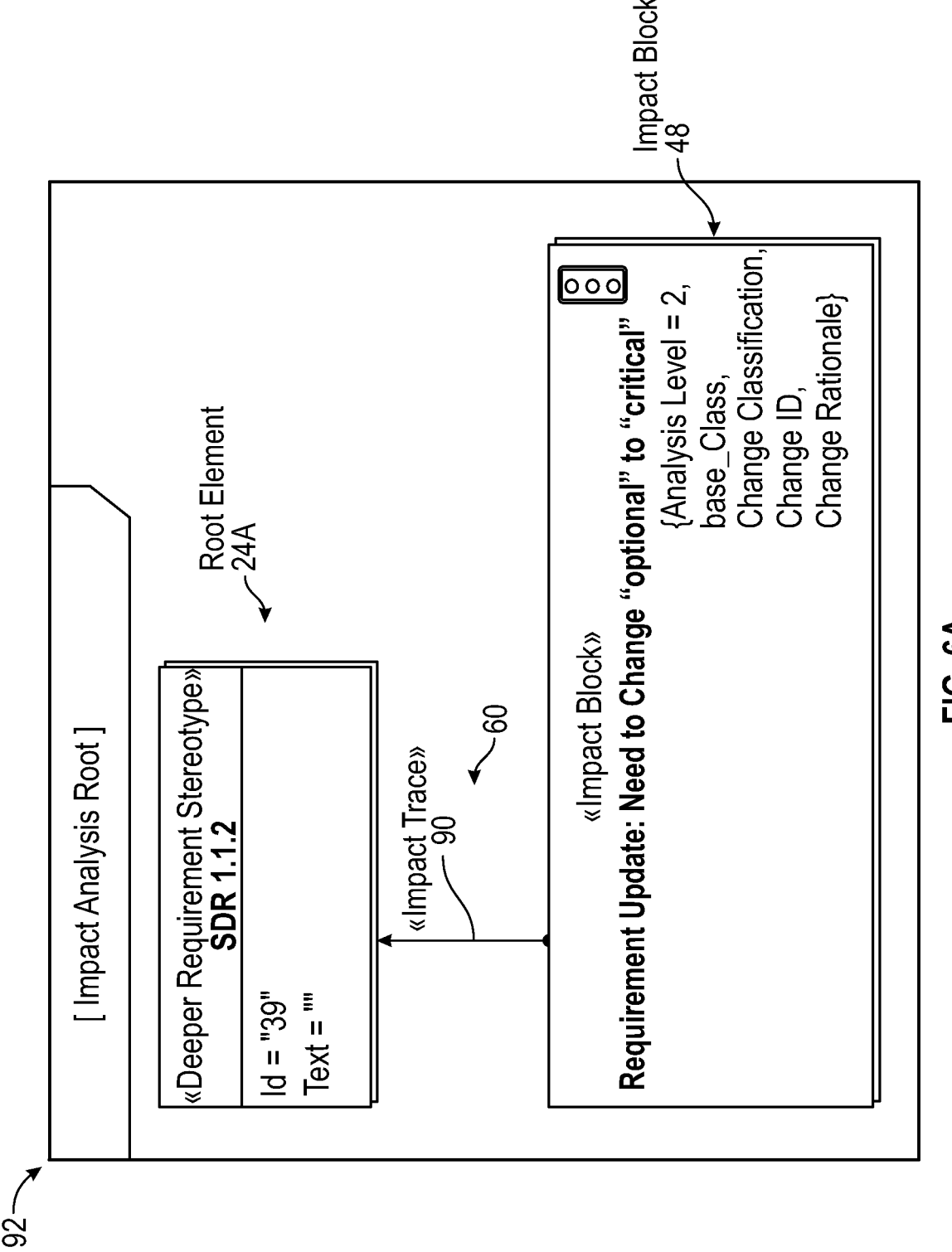
FIG. 6A is an illustration of an element diagram including an impact block and the root element, according to an exemplary embodiment.

Referring now to FIGS. 1, 3, and 6A, in one embodiment the model-based systems engineering tool 12 is configured to generate one or more element diagrams 92. The element diagrams 92 each display one or more elements 24 of the system model 22 found at a specific level for a particular relationship attribute 60 in combination with a base element 24 representing a preceding level of elements 24. For example, as seen in FIG. 6A, the element diagram 92 illustrates the relationship attribute 60 between the impact block 48 and the root element 24A, which is the impact trace 90. The root element 24A represents the elements 24 found at a root level, and the impact block 48 represents the preceding level of elements 24.

Figure 6B:
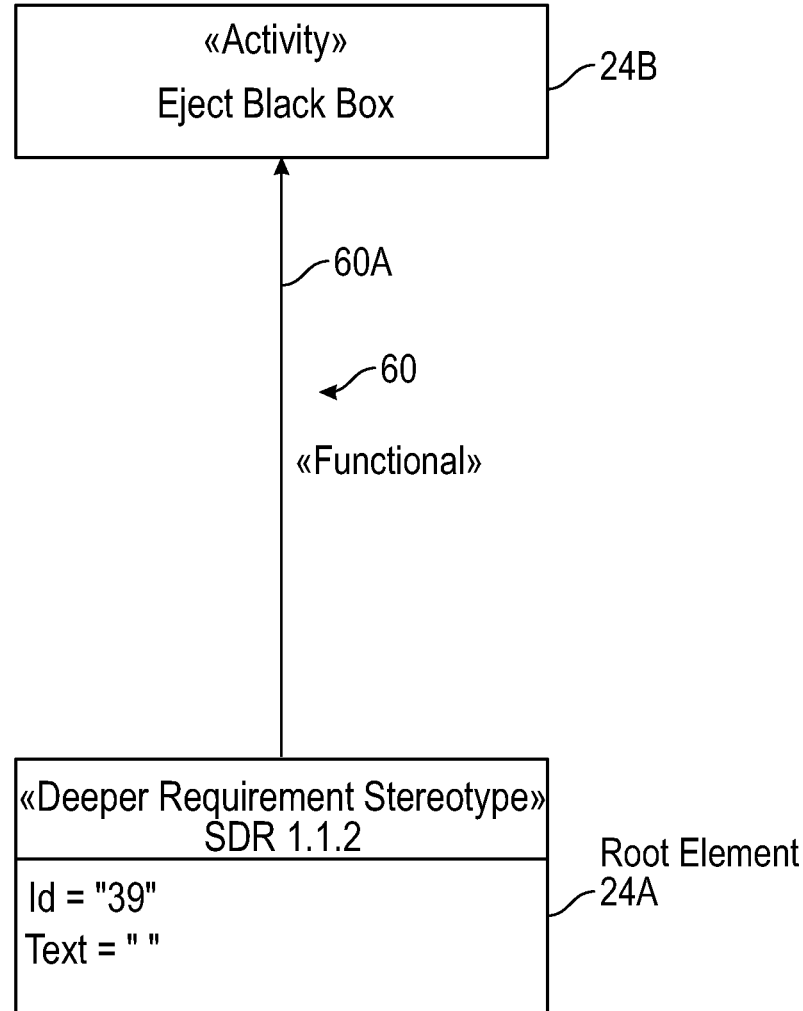
FIG. 6B is an illustration of an element diagram including the root element and one of the elements that are part of the first level of elements, according to an exemplary embodiment.

FIG. 6B illustrates yet another element diagram 92 showing the first level of elements 24B that include a functional relationship attribute 60A with respect to the root element 24A. For example, as seen in FIG. 3, a functional relationship attribute 60A exists between the root element 24A and the element 24B labeled "eject block box". Accordingly, as seen in FIG. 6B, the element 24B labeled "eject block box" represents the elements 24B of the first level of elements 40 having a functional relationship attribute 60A, and the root element 24A represents the preceding level of elements 24.

Figure 6C:
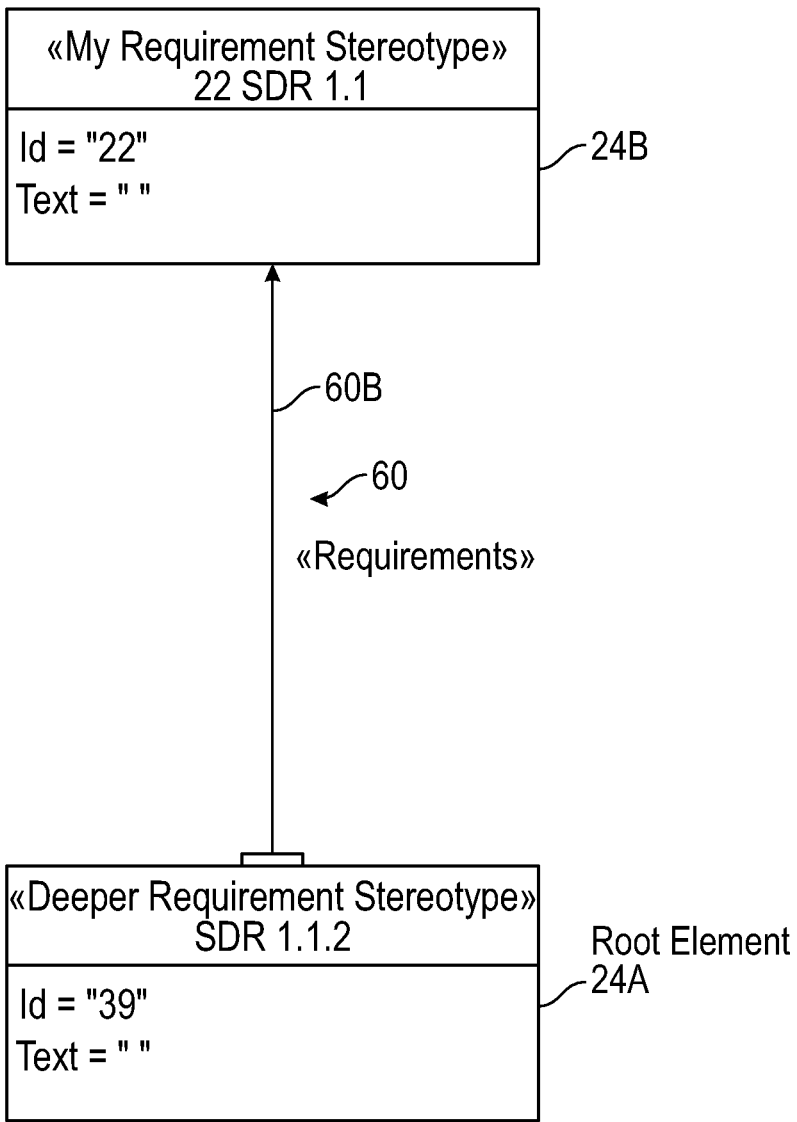
FIG. 6C is an illustration of another element diagram including the root element and another element that is part of the first level of elements, according to an exemplary embodiment.

Similarly, FIG. 6C illustrates an element diagram 92 showing the first level of elements 24B that include a requirements relationship attribute 60B with respect to the root element 24A. For example, as seen in FIG. 3, a requirements relationship attribute 60B is exists between the root element 24A and the element 24B labeled "22 SDR 1.1". Accordingly, as seen in FIG. 6C, the element 24B labeled "22 SDR 1.1" represents the elements 24B of the first level of elements 40 having a requirements relationship attribute 60B, and the root element 24A represents the preceding level of elements 24.

Figure 6D:
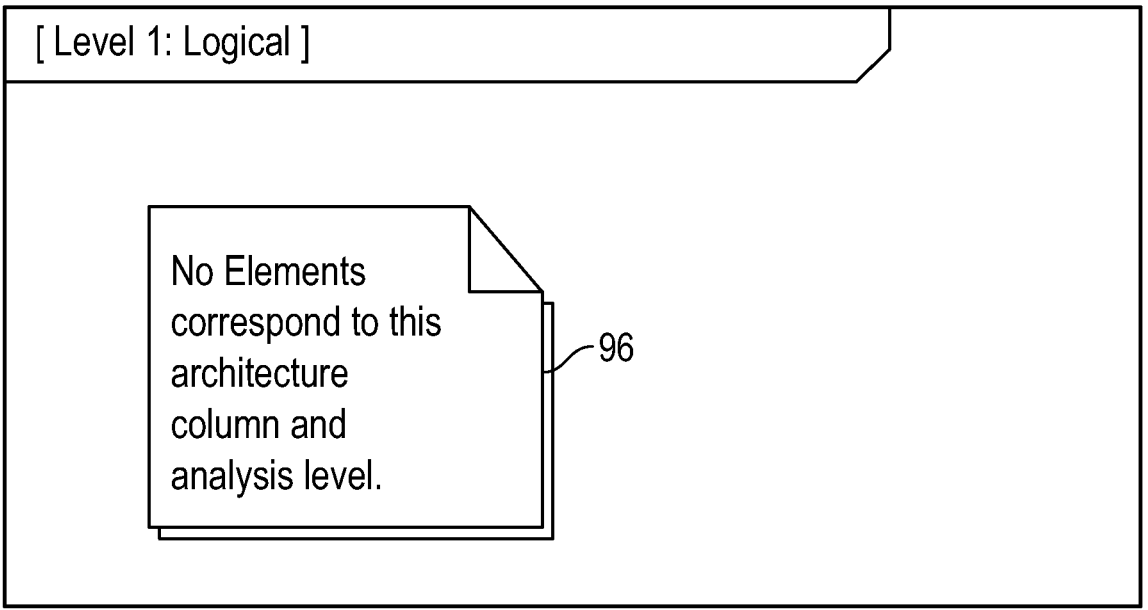
FIG. 6D is an illustration of yet another embodiment of the element diagram, where no elements match the architecture, according to an exemplary embodiment.

Referring now to FIG. 6D, if no elements exist at a specific level for a particular relationship attribute 60, then the model-based systems engineering tool 12 is configured to generate a notification 96 informing the user 20 (FIG. 1) that no elements 24 correspond to the architecture and analysis level. For example, in the embodiment as shown in FIG. 3, the first level of elements 40 does not include any elements 24B having a logical relationship attribute 60C with the root element 24A. Accordingly, the notification 96 informs the user that no elements 24 correspond to the particular architecture.

Figure 7:
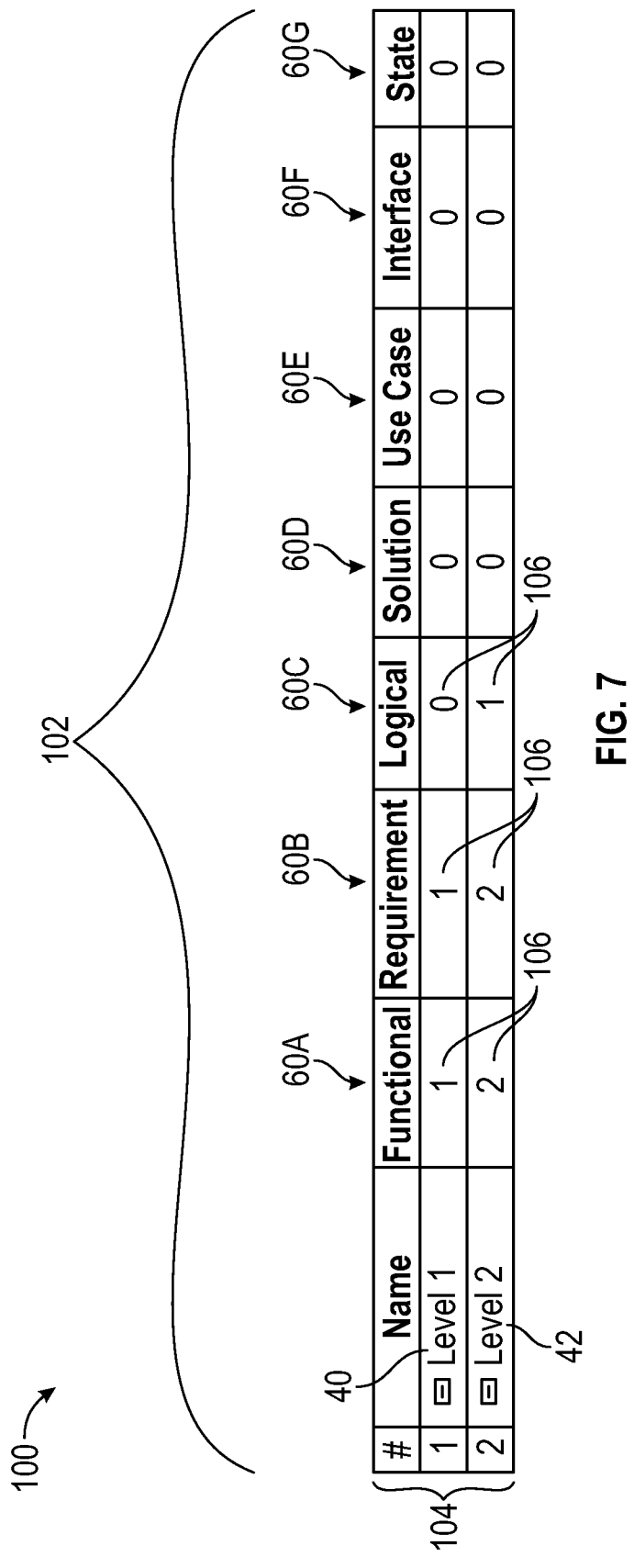
FIG. 7 is an illustration of a counts table, according to an exemplary embodiment.

Referring to FIGS. 1 and 7, in yet another embodiment the model-based systems engineering tool 12 is configured to generate a counts table 100. The counts table 100 includes a plurality of columns 102 and a plurality of rows 104. As seen in FIG. 7 the plurality of columns 102 list each available relationship attribute 60 (i.e., requirement, logical, functional, use case, state, interface, and solution), the plurality of rows 104 list the first level of elements 40 and the second level of elements 42. The counts table 100 lists a number of times 106 a specific relationship attribute 60 occurs for a particular level of elements. For example, referring to both FIGS. 3 and 7, the requirements relationship attribute 60B occurs once at the first level of elements 40 and twice at the second level of elements 42. Accordingly, the counts table 100 lists a "1" under the column 102 labeled "requirement" for the first level of elements 40, and a "2" for the second level of elements 42.

Referring to FIGS. 1 and 8, in another embodiment, the model-based systems engineering tool 12 generates a detail table 110. The detail table 110 includes a plurality of columns 112 listing properties 116A-116G of the elements 24 and a plurality of rows 114 listing the root element 24A, the elements 24B of the first level of elements 40, and the elements 24C of the second level of elements 42. In the embodiment as shown in FIG. 8, the plurality of columns 112 include the following properties: a name property 116A, an owner property 116B, an applied stereotype property 116C, an allocation property 116D, a satisfy property 116E, a trace property 116F, and a described use case property 116G.

The name property 116A indicates a name of an element 24. The owner property 116B indicates an owner of the element 24. The applied stereotype property 116C defines how an existing metaclass may be extended and enables the use of platform or domain specific terminology or notation in place of, or in addition to, the ones used for the extended metaclass. The allocation property 116D indicates an allocation relationship to allocate one element 24 to another. The satisfy property 116E represents a relationship that is a dependency between a requirement and an element 24 that fulfills the requirement. The trace property 116F represents a dependency between a requirement and an element 24 traced by the corresponding requirement.

Figure 9:
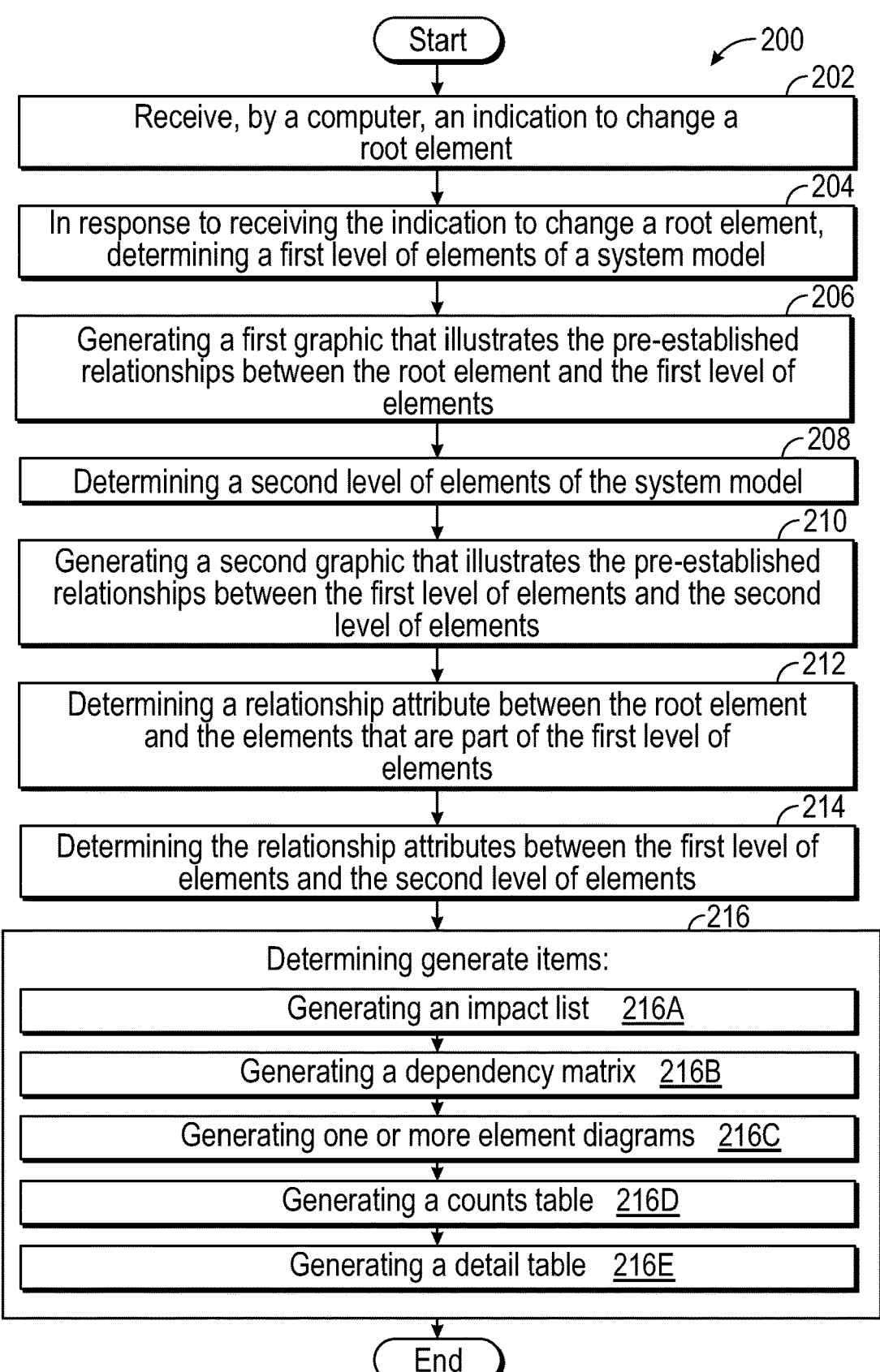
FIG. 9 is a process flow diagram illustrating an exemplary method for determining an impact analysis of a change upon a system model, according to an exemplary embodiment.

FIG. 9 is a process flow diagram illustrating a method 200 for determining an impact analysis of a change upon the system model 22 by the model-based systems engineering tool 12. Referring now to FIGS. 1, 2, 3, and 9, the method 200 begins at block 202. In block 202, the computer 10 receives an indication to change the root element 24A, where the root element 24A is one of a plurality of elements 24 that are part of the system model 22. The method 200 may then proceed to block 204.

In block 204, in response to receiving the indication to change the root element 24A, the model-based systems engineering tool 12 determines the first level of elements 40 of the system model 22 having a direct relationship to the root element 24A. The first level of elements 40 are determined based on pre-established relationships between the plurality of elements 24 stored in the relations database 26 (FIG. 1). the pre-established relationships are determined based on a model-based systems engineering architecture. The method 200 may then proceed to block 206.

In block 206, the model-based systems engineering tool 12 generates the first graphic 50 that illustrates the pre-established relationships between the root element 24A and the first level of elements 40. The method 200 may then proceed to block 208.

In block 208, the model-based systems engineering tool 12 determines the second level of elements 42 of the system model 22, where the second level of elements 42 each have a direct relationship to one of the first level of elements 40. The method 200 may then proceed to block 210.

In block 210, the model-based systems engineering tool 12 generates the second graphic 52 that illustrates the pre-established relationships between the first level of elements 40 and the second level of elements 42. The method 200 may then proceed to block 212.

In block 212, the model-based systems engineering tool 12 determines the relationship attribute 60 between the root element 24A and the elements 24B of the first level of elements 40. The method 200 may then proceed to block 214.

In block 214, the model-based systems engineering tool 12 determines the relationship attribute 60 between the first level of elements 40 and the second level of elements 42. The method 200 may then proceed to block 216.

In block 216, the model-based systems engineering tool 12 determines one or more items listed in blocks 216A-216E: Generating an impact list 216A, Generating a dependency matrix 216B, Generating one or more element diagrams 216C, Generating a counts table 216D, and Generating a detail table 216E. It is to be appreciated that the user 20 determines which items to generates based on his or her preferences as to how he or she would like to view the resulting data. Referring to FIGS. 4 and 9, in block 216A, the model-based systems engineering tool 12 generates the impact list 68. As mentioned above, the impact list 68 includes each of the first level of elements 40 and each of the second level of elements 42.

Referring to FIGS. 5 and 9, in block 216B the model-based systems engineering tool 12 generates the dependency matrix 72. The dependency matrix 72 illustrates dependencies between the root element 24A and the first level of elements 40, and between the first level of elements 40 and the second level of elements 42.

Referring now to FIGS. 6A, 6B, 6C, 6D, and 9, in block 216C the model-based systems engineering tool 12 generates one or more element diagrams 92. The one or more element diagrams 92 each display one or more elements 24 of the system model 22 found at a specific level for a particular relationship attribute 60 in combination with a base element 24 representing a preceding level of elements 24.

Referring to FIGS. 7 and 9, in block 216D the model-based systems engineering tool 12 generates the counts table 100. The counts table 100 includes the plurality of columns 102 listing relationship attributes 60 between the root element 24A, the first level of elements 40, and the second level of elements 42. As seen in FIG. 7, the counts table 100 includes the plurality of rows 104 indicating the number of times 106 a specific relationship attribute 60 occurs.

Finally, referring to FIGS. 8 and 9, in block 216E, the model-based systems engineering tool 12 generates the details table 110. The details table 110 lists the properties 116A-116G of the root element 24A, the elements 24B of the first level of elements 40, and the elements 24C of the second level of elements 42, where the properties 116A-116G include the name property 116A, the owner property 116B, the applied stereotype property 116C, the allocation property 116D, the satisfy property 116E, the trace property 116F, and the described use case property 116G. The method 200 may then terminate.

Referring generally to the figures, the disclosed model-based systems engineering tool utilizing the impact analysis macro provides various technical effects and benefits. Specifically, the disclosed model-based system engineering tool explores the impact of a change made to an element that is part of the system model. Specifically, once the first level of elements and the second level of elements are established, the model-based systems engineering tool groups and visualizes the elements affected by the change in several different arrangements to assist the user in understanding the potential implications of the change. Identifying the impact of changes to a systems has traditionally been a time-consuming and arduous process, and typically employs various experts in a particular field to analyze the effects of the change. The disclosed model-based systems engineering tool alleviates these issues by providing an automated tool that provides a visual display to the user indicating the potential impact to a system based on a change.

Figure 10:
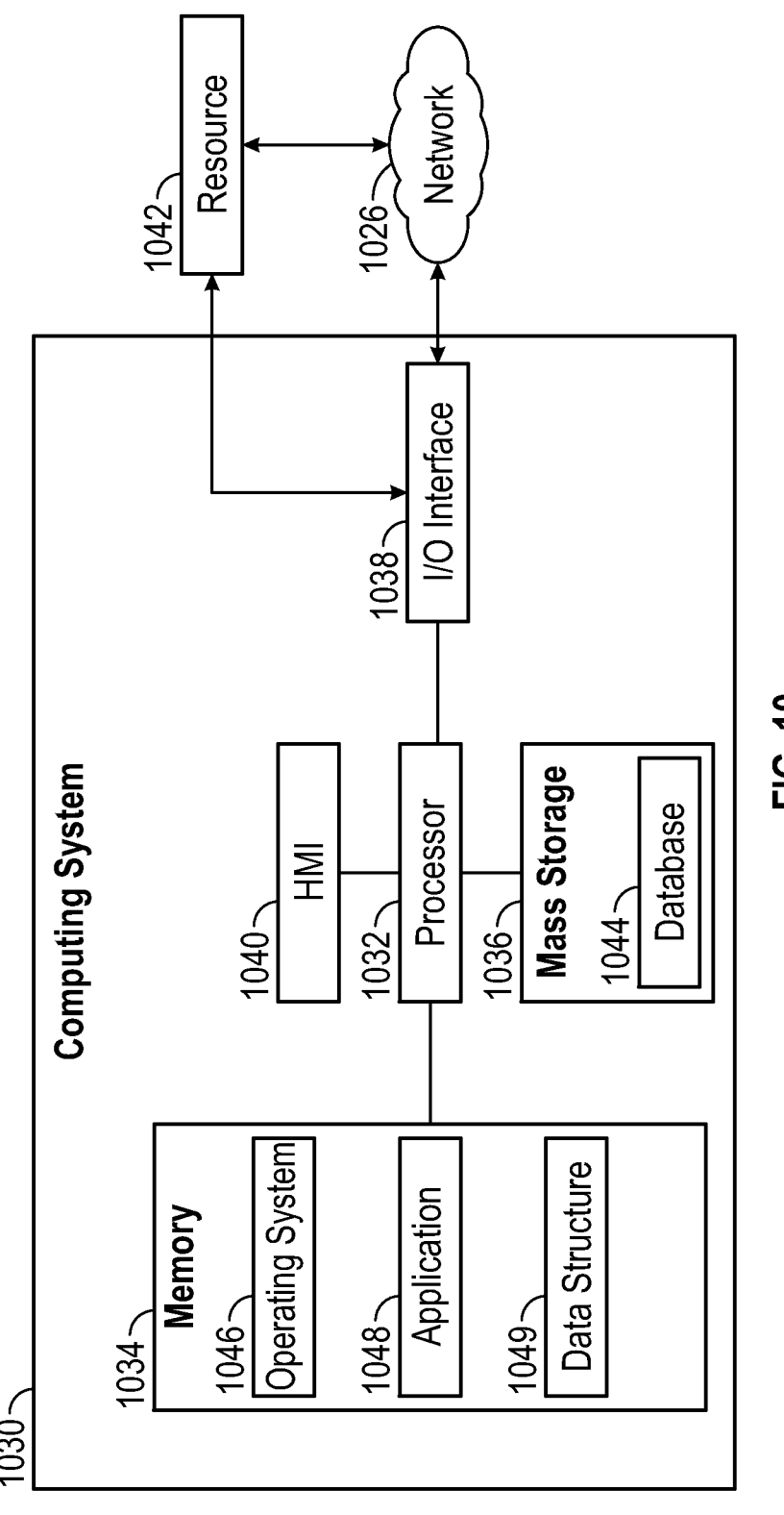
FIG. 10 is an illustration of the computer shown in FIG. 1, according to an exemplary embodiment.

Referring to FIG. 10, the computer 10 may be implemented on one or more computer devices or systems, such as exemplary computing system 1030. The computing system 1030 includes a processor 1032, a memory 1034, a mass storage memory device 1036, an input/output (I/O) interface 1038, and a Human Machine Interface (HMI) 1040. The computing system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computing system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computing system 1030. Indeed, given the nearly endless hardware and software configurations possible, persons having ordinary skill in the art will understand that examples of the disclosure may include applications that are located externally to the computing system 1030, distributed among multiple computers or other external resources 1042, or provided by computing resources (hardware and software) that are provided as a service over the network 1026, such as a cloud computing service.

The HMI 1040 is operatively coupled to the processor 1032 of computing system 1030 in a known manner to allow a user to interact directly with the computing system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure

What is claimed is:

1. A model-based systems engineering tool that determines an impact analysis of a change upon a system model, the model-based systems engineering tool comprising:
   a display device;
   an input device;
   a relations database that stores a framework describing pre-established relationships between a plurality of elements that are part of the system model, wherein the pre-established relationships are determined based on a model-based systems engineering architecture;
   one or more processors in electronic communication with the relations database; and
   a memory coupled to the one or more processors, the memory storing data into one or more databases and program code that, when executed by the one or more processors, causes the model-based systems engineering tool to:
      receive an indication to change a root element, wherein the root element is one of the plurality of elements that are part of the system model, and the indication is received from a user through the input device and the display device that displays one or more elements for the user to select the root element;
      in response to receiving the indication to change the root element, determine a first level of elements of the system model having a direct relationship to the root element, wherein the first level of elements are determined based on the pre-established relationships between the plurality of elements stored in the relations database;
      generate a first graphic and display the first graphic on the display device, wherein the first graphic that illustrates the pre-established relationships between the root element and the first level of elements; and
      generate an impact list and display the impact list on the display device to the user, wherein the impact list includes the root element and each of the first level of elements.

2. The model-based systems engineering tool of claim 1, wherein the one or more processors execute instructions to:
   after determining the first level of elements of the system model, determine a second level of elements of the system model, wherein the second level of elements each have a direct relationship to one of the first level of elements.

3. The model-based systems engineering tool of claim 2, wherein the one or more processors execute instructions to:
   generate a second graphic that illustrates the pre-established relationships between the first level of elements and the second level of elements.

4. The model-based systems engineering tool of claim 2, wherein the one or more processors execute instructions to:
   determine a relationship attribute between the root element and each of the first level of elements; and
   determine the relationship attribute between each of the first level of elements and each of the second level of elements, wherein the relationship attribute is described by the pre-established relationships between the plurality of elements of the system model stored in the relations database.

5. The model-based systems engineering tool of claim 4, wherein the relationship attribute is selected from one of the following: a functional relationship attribute, a requirement relationship attribute, a logical relationship attribute, a solution relationship attribute, a use case relationship attribute, an interface relationship attribute, and a state relationship attribute.

6. The model-based systems engineering tool of claim 2, wherein the impact list also includes each of the second level of elements.

7. The model-based systems engineering tool of claim 2, wherein the one or more processors execute instructions to:
   generate a dependency matrix that illustrates dependencies between the root element and the first level of elements, and between the first level of elements and the second level of elements.

8. The model-based systems engineering tool of claim 2, wherein the one or more processors execute instructions to:
   generate one or more element diagrams, wherein the one or more element diagrams each display one or more elements of the system model found at a specific level for a particular relationship attribute in combination with a base element representing a preceding level of elements.

9. The model-based systems engineering tool of claim 2, wherein the one or more processors execute instructions to:
   generate a counts table, wherein the counts table includes a plurality of columns listing relationship attributes between the root element, the first level of elements, and the second level of elements, and wherein the counts table includes a plurality of rows that indicate a number of times a specific relationship attribute occurs.

10. The model-based systems engineering tool of claim 2, wherein the one or more processors execute instructions to:
   generate a detail table that lists the root element, the first level of elements, and the second level of elements, wherein the detail table indicates a name property, an owner property, an applied stereotype property, an allocation property, a satisfy property, a trace property, and a described use case property.

11. The model-based systems engineering tool of claim 1, wherein the indication is to change more than one root element that is part of the system model.

12. The model-based systems engineering tool of claim 1, wherein the one or more processors execute instructions to:
   generate a dependency matrix that illustrates dependencies between the root element and the first level of elements.

13. A method for determining an impact analysis of a change upon a system model by a model-based systems engineering tool, the method comprising:
   receiving, by a computer, through an input device and a display device, an indication to change a root element selected by a user from one or more elements displayed on the display device, wherein the root element is one of a plurality of elements that are part of the system model;

in response to receiving the indication to change the root element, determining a first level of elements of the system model having a direct relationship to the root element, wherein the first level of elements are determined based on pre-established relationships between the plurality of elements stored in a relations database, and wherein the pre-established relationships are determined based on a model-based systems engineering architecture;

generating a first graphic and displaying the first graphic on the display device, wherein the first graphic illustrates the pre-established relationships between the root element and the first level of elements; and generating an impact list and displaying the impact list on the display device, wherein the impact list includes the root element and each of the first level of elements.

14. The method of claim 13, further comprising:

determining a second level of elements of the system model, wherein the second level of elements each have a direct relationship to one of the first level of elements.

15. The method of claim 14, further comprising:

generating a second graphic that illustrates the pre-established relationships between the first level of elements and the second level of elements.

16. The method of claim 14, further comprising:

determining a relationship attribute between the root element and the elements of the first level of elements; and determining the relationship attribute between the first level of elements and the second level of elements, wherein the relationship attribute is described by the pre-established relationships between the plurality of elements of the system model stored in the relations database.

17. The method of claim 14, wherein the impact list also includes each of the second level of elements.

18. The method of claim 14, further comprising:

generating a dependency matrix that illustrates dependencies between the root element and the first level of elements, and between the first level of elements and the second level of elements.

19. The method of claim 14, further comprising:

generating one or more element diagrams, wherein the one or more element diagrams each display one or more elements of the system model found at a specific level for a particular relationship attribute in combination with a base element representing a preceding level of elements.

20. The method of claim 14, further comprising:

generating a counts table, wherein the counts table includes a plurality of columns listing relationship attributes between the root element, the first level of elements, and the second level of elements, and wherein the counts table includes a plurality of rows that indicate a number of times a specific relationship attribute occurs.

\* \* \* \* \*